: 5,316,813
: May 31, 1994

United States Patent [19]
Nishimura et al.

[54] OPTICAL RECORDING MEDIUM

[75] Inventors: Tetsuya Nishimura; Eiji Yagyu; Motomu Yoshimura, all of Amagasaki, Japan

[73] Assignee: Mitsubishi Denki Kabushiki Kaisha, Tokyo, Japan

[21] Appl. No.: 868,232

[22] Filed: Apr. 14, 1992

[30] Foreign Application Priority Data

Apr. 15, 1991 [JP] Japan .................................. 3-80345

[51] Int. Cl.$^5$ .............................................. B32B 3/00
[52] U.S. Cl. ...................................... 428/64; 428/65; 428/913; 430/945; 346/76 L; 346/135.1; 369/288
[58] Field of Search ............... 428/64, 65, 411.1, 913; 430/945; 346/76 L, 135.1; 369/288

[56] References Cited

U.S. PATENT DOCUMENTS

| | | | |
|---|---|---|---|
| 3,896,420 | 7/1975 | Szabo | 340/173 CC |
| 4,101,976 | 7/1978 | Castro | 365/119 |
| 4,158,890 | 6/1979 | Burland | 365/119 |
| 4,693,915 | 9/1987 | Matsuda et al. | 427/256 |
| 4,819,206 | 4/1989 | Yoshiimura | 365/106 |
| 5,032,973 | 7/1991 | Yoshimura | 365/119 |

FOREIGN PATENT DOCUMENTS 0396943 11/1990 European Pat. Off. .
3510361 10/1985 Fed. Rep. of Germany .

OTHER PUBLICATIONS

IBM J. Res. Develop., vol. 26, No. 2, Mar. 1982.

Primary Examiner—Patrick J. Ryan
Assistant Examiner—Elizabeth Evans
Attorney, Agent, or Firm—Burns, Doane, Swecker & Mathis

[57] ABSTRACT

In an optical recording medium, 4,8-diamino-2-(4-hexyloxyphenyl)-1,5-dihydroxyanthraquinone is used as guest molecules, for an optical recording layer, and a compound expressed by a general formula (1):

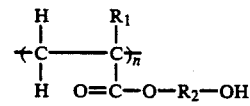

(where $R_1$ denotes H or $CH_3$, $R_2$ denotes $C_2H_4$, $C_3H_6$ or $C_4H_8$, and n denotes an integer) is used for the host molecules. Since holes are caused in the wavelength region of the semiconductor laser, optical recording can be performed efficiently by using a semiconductor laser.

4 Claims, 4 Drawing Sheets

OPTICAL RECORDING MEDIUM

BACKGROUND OF THE INVENTION

1. Field of the Invention

The present invention relates to an optical recording medium. More particularly, the present invention relates to an optical recording medium for multiple-recording by using photochemical hole burning.

2. Description of the Related Art

Hitherto, it is known that information can be recorded in an optical recording medium by using photochemical hole burning (hereinafter referred to as PHB).

An optical recording medium, which has an optical recording layer, employing this PHB method, is used in which host molecules, such as a high polymer, such as polymethyl methacrylate (hereinafter referred to as PMMA), are dissolved in a solvent, such as alcohol, and guest molecules, such as phthalocyanine (hereinafter referred to as $H_2PC$) or quinizarin (hereinafter referred to as DAQ), are diffused in a diluted condition, this solvent then being applied to glass or a high polymer film and dried [IBM Journal Research Development (J. RES. DEVLOP.), Vol.26, No. 2, pp.198-207, (March, 1982)].

When the recording medium is maintained at an extremely low temperature, for example, a liquefied helium temperature (4.2 K.), the energy of specific guest molecules is frozen to a specific energy state determined by an interaction with the host molecules specific to the guest molecules, thus permitting their energy state to be distinguished from the energy state of the other guest molecules. As a result, the wavelength position of an absorption spectrum of the specific guest molecules is fixed at a specific position. In this condition, if a light beam of a specific wavelength ($\lambda n$) is spread on the recording medium, only the guest molecules having absorption at that wavelength position absorb light and move to another energy state. As a result, the absorbance of the recording layer in the specific wavelength ($\lambda n$) is decreased, causing a hole at the position of ($\lambda n$) in the spectrum. The use of the presence and absence of this hole as binary coded signals of 0 and 1 permits optical recording (see FIG. 6). If two or more kinds of wavelengths ($\lambda n$) of a light beam used for recording are used, recording at each wavelength, that is, what is called multiplerecording in terms of wavelength dimensions, can be performed (see FIG. 7).

However, in the above-described conventional optical recording medium, that is, an optical recording medium in which DAQ or the like is used for guest molecules and PMMA or the like is used for host molecules, the wavelength region of a laser for causing holes does not match a semiconductor laser wavelength region (see FIG. 8). Therefore, a dye laser cannot choose but be used at present. A dye laser is generally large in construction and is not easy to use, and maintenance thereof is not simple.

Therefore, when an optical recording system is constructed, a laser, such as a semiconductor laser which can be easily systemized, should preferably be used.

SUMMARY OF THE INVENTION

The present invention has been accomplished to solve the above-mentioned problems of the prior art.

Accordingly, an object of the present invention is to provide an optical recording medium which is capable of performing optical recording efficiently with a semiconductor laser.

After the inventors of the present invention made active studies, they were able to solve the above-mentioned problems of the prior art.

According to the present invention, there is provided an optical recording medium which uses photochemical hole burning comprising: guest molecules, at least one kind of molecule selected from a group consisting of 4-amino-2,6-bis (4-butylphenoxy)-1,5,8-trihydroxyanthraquinone, 4,8-diamino-2-(4-hexyloxyphenyl)-1,5-dihydroxyanthraquinone and 4,11diamino-5,10-dihydro-2-(3-octyl oxy) propyl-3-oxonaphtho [2,3-f]isoindoline-1,5,10-trion is used, and a compound expressed by a general formula (1):

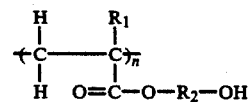

(where $R_1$ denotes H or $CH_3$, $R_2$ denotes $C_2H_4$, $C_3H_6$ or $C_4H_8$, and n denotes an integer) is used for host molecules.

In the general formula (1) described above, $R_1=CH_3$ and $R_2=C_2H_4$ are assumed to be PHEMA,
$R_1=CH_3$ and $R_2=C_3H_6$ are assumed to be PHPMA,
$R_1=CH_3$ and $R_2=C_4H_8$ are assumed to be PHBMA,
$R_1=H$ and $R_2=C_2H_4$ are assumed to be PHEAC,
$R_1=H$ and $R_2=C_3H_6$ are assumed to be PHPAC, and
$R_1=H$ and $R_2=C_4H_8$ are assumed to be PHBAC.

DESCRIPTION OF THE PREFERRED EMBODIMENTS

Figure 1:
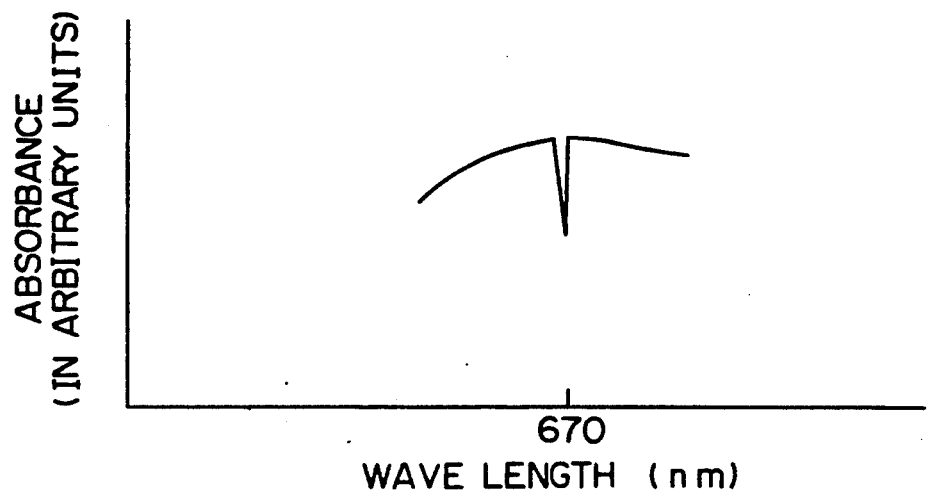
FIG. 1 is a view which illustrates the result of a light absorption spectrum after a semiconductor laser is made to irradiate a recording medium according to a first embodiment of the present invention.

The present invention will be explained below in more detail.

An optical recording medium of the present invention can perform optical recording efficiently by using a semiconductor laser by a method wherein host molecules and guest molecules are combined properly; these molecules are mixed uniformly; and they are applied to an appropriate base material and dried.

For the host molecules of the optical recording medium of the present invention, PHEMA, PHPMA, PHBMA, PHEAC, PHPAC, and PHBAC, having a molecular weight of 100,000 to 2,000,000, should preferably be used and, in particular, PHEMA, PHPMA and PHBMA are preferable from the viewpoint of makeing the temperature of the glass transition point higher. Independently of this, the kinds of the ingredient units of the general formula (1) of the host molecules may be or may not be the same.

To perform PHB efficiently, the ratio of guest molecules/host molecules is preferably $10^{-2}$ to $10^{-6}$ in terms of molar ratio and, more preferably, $10^{-3}$ to $10^{-5}$ To make the guest molecules dilutely and uniformly diffused in the host molecules, these molecules should be dissolved into, for example, an organic solvent. For preferable organic solvents, an alcoholic mixed solvent of alcohol, such as methanol, ethanol, or methoxyethanol, and tetrahydrofuran (hereinafter referred to as THF) can be cited.

As described above, when guest molecules/host molecules which are dissolved in, for example, an alcoholic mixed solvent, are applied to an appropriate base material, such as glass, and dried, the optical recording medium of the present invention is completed, and PHB can be formed by a semiconductor laser.

The use of 4-amino-2,6-bis (4-butylphenoxy)-1,5,8trihydroxyanthraquinone, 4,8-diamino-2-(4-hexyloxyphenyl)-1,5dihydroxyanthraquinone and 4,11-diamino-5,10-dihydro-2-(3-octyl oxy) propyl-3-oxonaphtho [2,3-f]isoindoline-1,5,10trion for the guest molecules causes the large $\pi$ electron conjugate system of the guest molecules to be expanded more than, for example, DAQ, thereby expanding the wavelength region of a laser which generates holes therein.

In addition, the use of a compound, expressed by the general formula (1), having two such functional groups having large polarities as a carbonyl group and a hydroxyl group for the host molecules causes the light absorption wavelength region of an optical recording medium formed with the above guest molecules to be red-shifted. Thus, a semiconductor laser can be used as a light source for optical recording.

The present invention will be explained below with reference to the embodiments.

First Embodiment

For the guest molecules of the optical recording layer, 4,8-diamino-2-(4-hexyloxyphenyl)-1,5-dihydroxyanthraquinone (hereinafter referred to as DAHAQ) was used. For the host molecules, PHEMA of a molecular weight of approximately 1,000,000 was used. The guest molecules DAHAQ and the host molecules PHEMA were prepared so that the ratio of the two molecules becomes $10^{-4}$ in terms of molar ratio. They are dissolved into a mixed solvent of ethanol and THF, applied onto a glass plate (width: 1 cm, length: 1 cm, and thickness: 0.5 mm) and dried, forming an optical recording medium.

This optical recording medium is maintained in a cooling apparatus, and a visible-light semiconductor laser beam (wavelength: 670 nm, and energy density: 50 $\mu$W/cm$^2$) was irradiated in a state in which the optical recording medium is cooled in a liquefied helium temperature (4.2 K.). Thereafter, an absorption spectrum was observed.

It can be seen from the results of the observation shown in FIG. 1 that a hole was produced by the semiconductor laser beam.

It is thought that the PHB in the first embodiment is produced because the interaction between OH groups, NH$_2$ groups and C=O groups (the DAHAQ molecules have all of these groups), and OH groups and C=O groups (the PHEMA molecules have both of these groups) changes before and after DAHAQ is irradiated with the light beam. It is considered that the $\pi$ electron conjugate system of the DAHAQ is expanded to redside more than DAQ in the prior art, thereby expanding the PHB wavelength region. Therefore, the use of this optical recording medium permits optical recording employing PHB with a semiconductor laser.

Second Embodiment

For the guest molecules of the optical recording layer, 4,11-diamino-5,10-dihydro-2-(3-octyl oxy) propyl-3-oxonaphtho [2,3-f]isoindoline-1,5,10-trion (hereinafter referred to as DAN) was used. For the host molecules, PHEMA of a molecular weight of approximately 1,000,000 was used. The optical recording medium was produced under the same conditions as in the first embodiment, except that the ratio of the guest molecules DAN to the host molecules PHEMA was set at $10^{-4}$ in terms of molar ratio.

Next, a light beam (wavelength: 750 nm, and energy density: 80 $\mu$W/cm$^2$) was irradiated under the same conditions as in the first embodiment. Thereafter, an absorption spectrum was observed.

Figure 2:
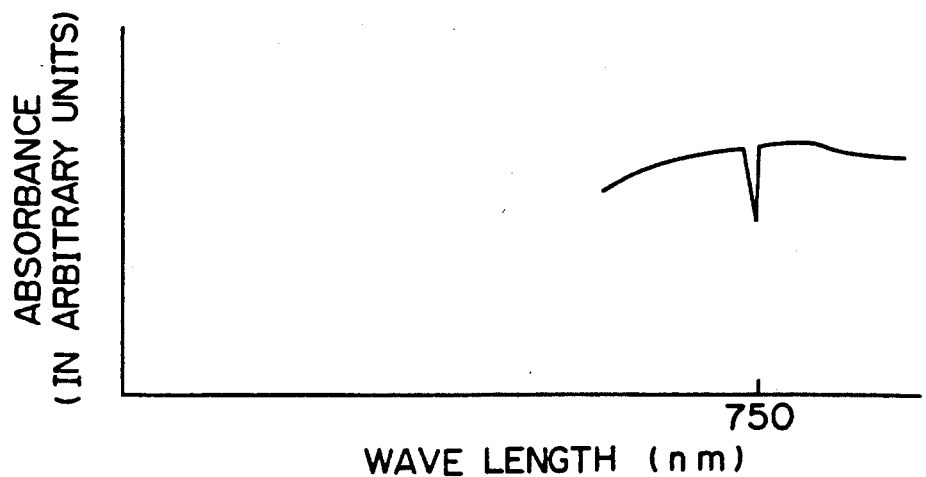
FIG. 2 is a view which illustrates the result of a light absorption spectrum after a semiconductor laser is made to irradiate a recording medium according to a second embodiment of the present invention.

It can be seen from the results of the observation shown in FIG. 2 that a hole was produced at a wavelength near 750 nm. Therefore, the use of this optical recording medium permits optical recording employing PHB with a semiconductor laser.

Third Embodiment

For the guest molecules of the optical recording layer, 4-amino-2,6-bis (4-butylphenoxy)-1,5,8trihydroxyanthraquinone (hereinafter referred to as ABTAQ) was used. For the host molecules, PHEMA of a molecular weight of approximately 1,000,000 was used. The optical recording medium was produced under the same conditions as in the first embodiment, except that the ratio of the guest molecules ABTAQ to the host molecules PHEMA was set at $10^{-4}$ in terms of molar ratio.

Next, a light beam (wavelength: 630 nm, and energy density: 100 $\mu$W/cm$^2$) was irradiated under the same conditions as in the first embodiment. Thereafter, an absorption spectrum was observed.

Figure 3:
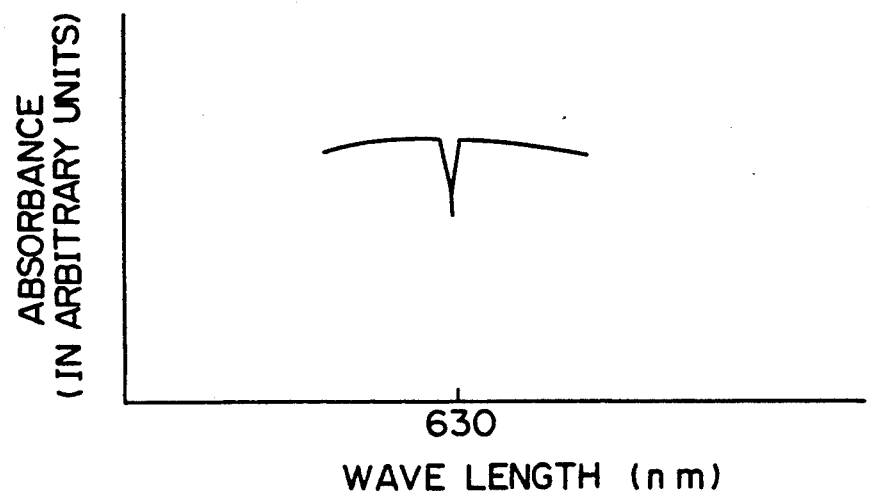
FIG. 3 is a view which illustrates the result of a light absorption spectrum after a semiconductor laser is made to irradiate a recording medium according to a third embodiment of the present invention.

It can be seen from the results of the observation shown in FIG. 3 that a hole was produced at a wavelength near 630 nm. Therefore, the use of this optical recording medium permits optical recording employing PHB with a visible-light semiconductor laser.

Fourth Embodiment

For the guest molecules of the optical recording layer, ABTAQ was used. For the host molecules, PHPMA of a molecular weight of approximately 1,000,000 was used. The optical recording medium was produced under the same conditions as in the first embodiment, except that the ratio of the guest molecules ABTAQ to the host molecules PHPMA was set at $10^{-4}$ in terms of molar ratio.

Next, a light beam (wavelength: 630 nm, and energy density: 100 $\mu$W/cm$^2$) was irradiated under the same conditions as in the first embodiment. Thereafter, an absorption spectrum was observed.

Figure 4:
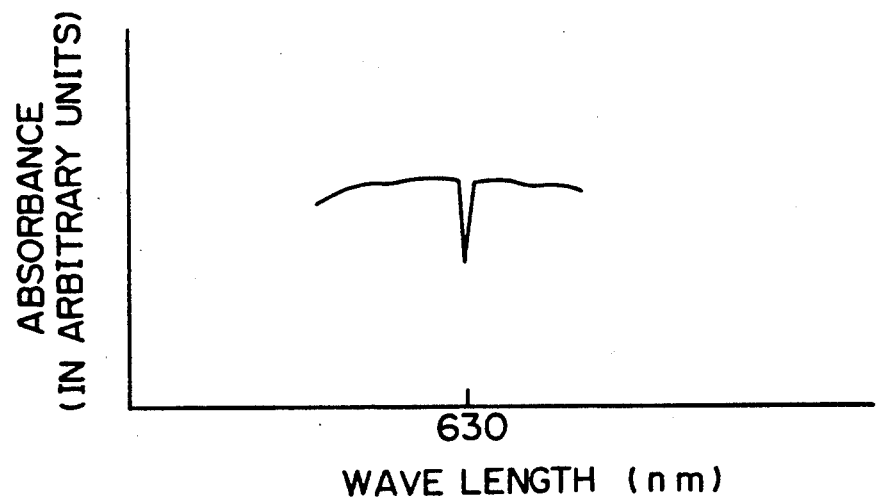
FIG. 4 is a view which illustrates the result of a light absorption spectrum after a semiconductor laser is made to irradiate a recording medium according to a fourth embodiment of the present invention.

It can be seen from the results of the observation shown in FIG. 4 that a hole was produced at a wavelength near 630 nm. Therefore, the use of this optical recording medium permits optical recording employing PHB with a visible-light semiconductor laser.

Fifth Embodiment

For the guest molecules of the optical recording layer, DAHAQ was used. For the host molecules, PHBMA of a molecular weight of approximately 1,000,000 was used. The optical recording medium was produced under the same conditions as in the first embodiment, except that the ratio of the guest molecules DAHAQ to the host molecules PHBMA was set at $10^{-4}$ in terms of molar ratio.

Next, a light beam (wavelength: 670 nm, and energy density: 50 $\mu$W/cm$^2$) was irradiated under the same conditions as in the first embodiment. Thereafter, an absorption spectrum was observed.

Figure 5:
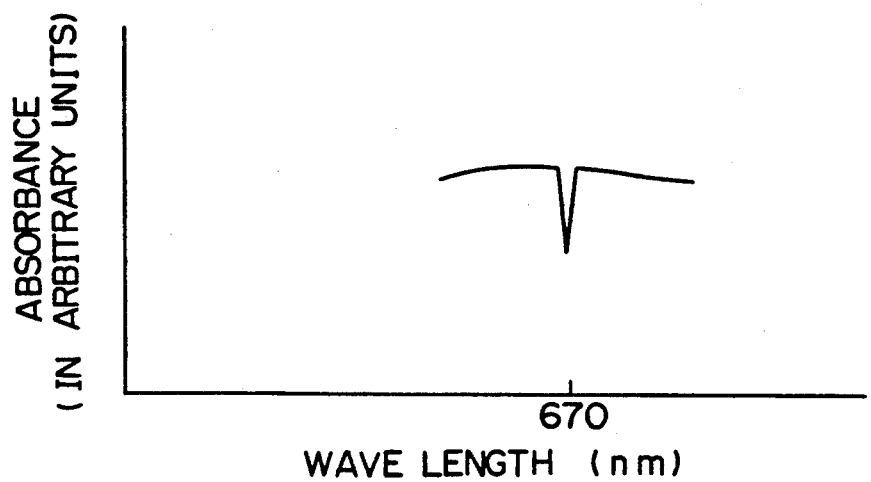
FIG. 5 is a view which illustrates the result of a light absorption spectrum after a semiconductor laser is made to irradiate an recording medium according to a fifth embodiment of the present invention.
Figure 6:
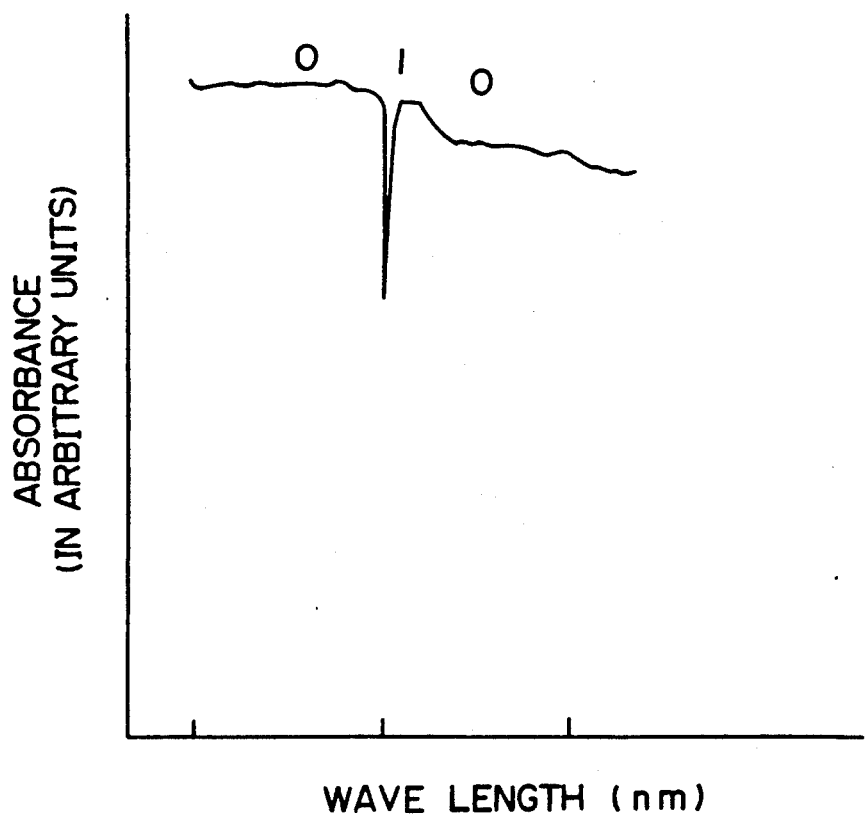
FIG. 6 is a view of fundamental optical recording using PHB.
Figure 7:
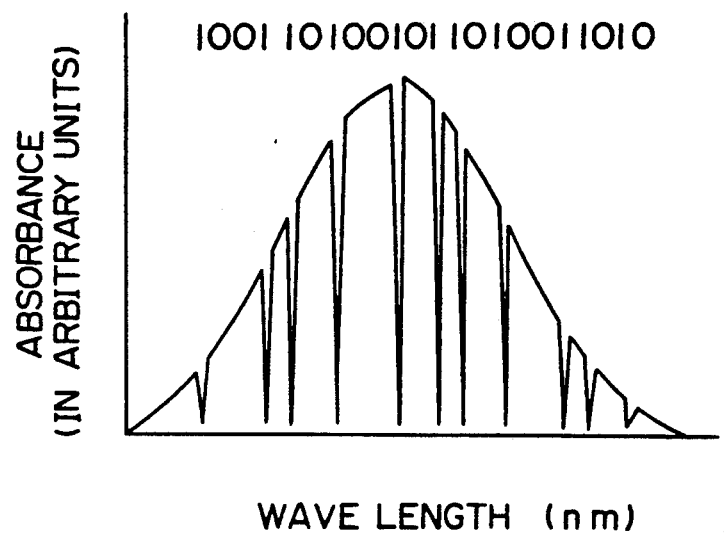
FIG. 7 is a view which illustrates a light absorption spectrum of an optical recording medium which is capable of using two or more kinds of wavelength.
Figure 8:
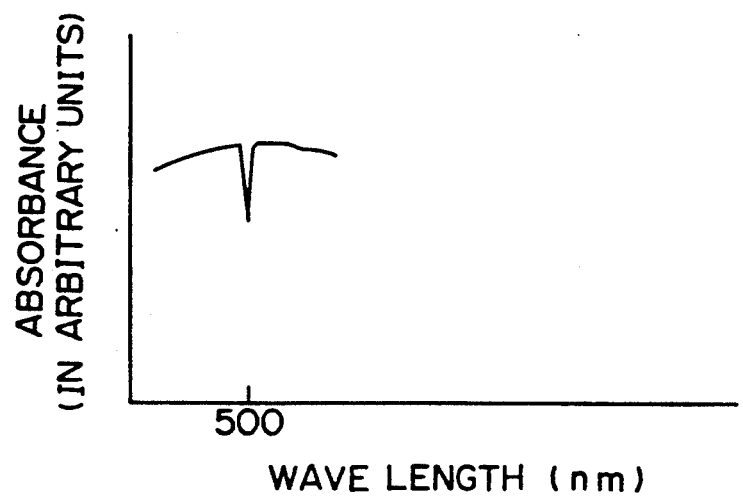
FIG. 8 is a view which illustrates a light absorption spectrum after a dye laser is made to irradiate a conventional optical recording medium.

It can be seen from the results of the observation shown in FIG. 5 that a hole was produced at a wavelength near 670 nm. Therefore, the use of this optical recording medium permits optical recording employing PHB with a semiconductor laser.

What is claimed is:

1. An optical recording medium useful for recording by photochemical hole burning comprising:
   guest molecules for an optical recording layer of at least one kind selected from a group consisting of 4-amino-2,6-bis (4-butylphenoxy)-1,5,8-trihydroxyanthraquinone, 4,8-diamino-2-(4-hexyloxyphenyl)-1,5dihydroxyanthraquinone, and 4,11-diamino-5,10-dihydro-2-(3-octyl oxy) propyl-3-oxonaphtho [2,3-f]isoindoline-1,5,10-trion; and
   host molecules expressed by a general formula (1):

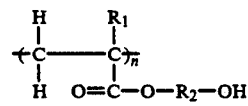

(where $R_1$ denotes H or $CH_3$, $R_2$ denotes $C_2H_4$, $C_3H_6$ or $C_4H_8$, and n denotes an integer).

2. An optical recording medium according to claim 1 wherein the ratio of the guest molecules to the host molecules is $10^{-2}$ to $10^{-6}$ in terms of molar ratio.

3. An optical recording medium according to claim 1 wherein the ratio of the guest molecules to the host molecules is $10^{-3}$ to $10^{-5}$ in terms of molar ratio.

4. An optical recording medium according to claim 1 wherein optical recording is performed on the optical recording medium by using a semiconductor laser.

* * * * *